United States Patent
Gill

(10) Patent No.: US 6,587,317 B2
(45) Date of Patent: *Jul. 1, 2003

(54) SPIN VALVE SENSOR HAVING A PINNED LAYER STRUCTURE COMPOSED OF COBALT IRON VANADIUM (COFEV)

(75) Inventor: Hardayal Singh Gill, Portala Valley, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/565,163

(22) Filed: May 3, 2000

(65) Prior Publication Data

US 2002/0135952 A1 Sep. 26, 2002

(51) Int. Cl.[7] ................................................. G11B 5/127
(52) U.S. Cl. .................................................. 360/324.11
(58) Field of Search .............................. 360/324, 324.1, 360/324.11, 324.12, 317; 324/207

(56) References Cited

U.S. PATENT DOCUMENTS

| 5,668,688 | A | * | 9/1997 | Dykes et al. | ................ | 360/324 |
| 5,835,313 | A | * | 11/1998 | Sato et al. | ................... | 360/317 |
| 6,226,159 | B1 | | 5/2001 | Pinarbasi | ............... | 360/324.11 |
| 6,282,069 | B1 | * | 8/2001 | Nakazawa et al. | ........ | 360/324.2 |
| 6,301,088 | B1 | * | 10/2001 | Nakada | ................. | 360/324.11 |
| 6,347,022 | B1 | * | 2/2002 | Saito | ........................... | 360/126 |
| 6,424,506 | B1 | * | 7/2002 | Saito et al. | ............ | 360/324.11 |

OTHER PUBLICATIONS

U.S. patent application Ser. No. 09/206,004, Pinarbasi, filed Dec. 4, 1998.
U.S. patent application Ser. No. 09/447,197, Gill, filed Nov. 22, 1999.
U.S. patent application Ser. No. 09/547,960, Pinarbasi, filed Apr. 12, 2000.
IEEE Press, "Ferromagnetism" by R. M. Bozorth, Iron Cobalt Alloys, pp. 198–205, 1951.

* cited by examiner

Primary Examiner—Allen Cao
(74) Attorney, Agent, or Firm—Ervin F. Johnston

(57) ABSTRACT

A pinned layer structure composed of cobalt iron vanadium (CoFeV) is provided in a spin valve sensor for reducing sense current shunting and decreasing a sense current field exerted on a free layer structure. A preferred antiparallel (AP) pinned layer structure has an antiparallel coupling layer between first and second AP pinned layers wherein the first AP pinned layer interfaces a pinning layer and the second AP pinned layer interfaces a copper spacer layer. In a preferred embodiment the first AP pinned layer is cobalt iron vanadium (CoFeV) and the second AP pinned layer comprises first and second films wherein the first film is cobalt iron vanadium (CoFeV) and the second film is cobalt iron (CoFe) with the second film having a higher cobalt (Co) content than the first film and interfacing the copper spacer layer.

57 Claims, 11 Drawing Sheets

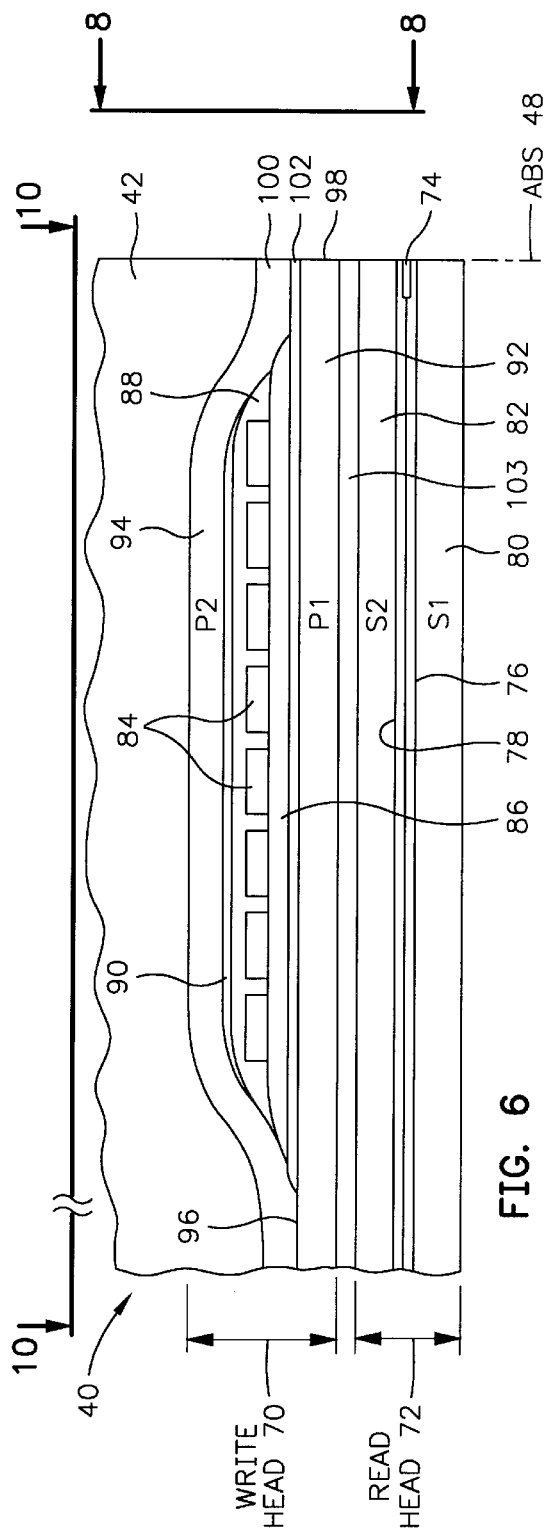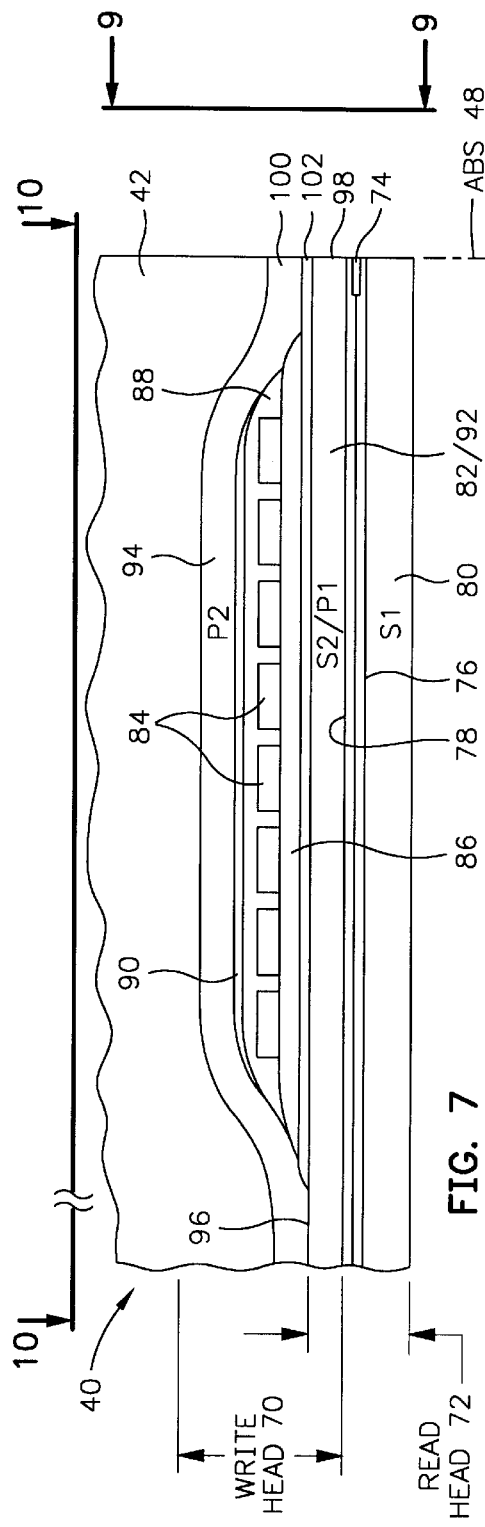

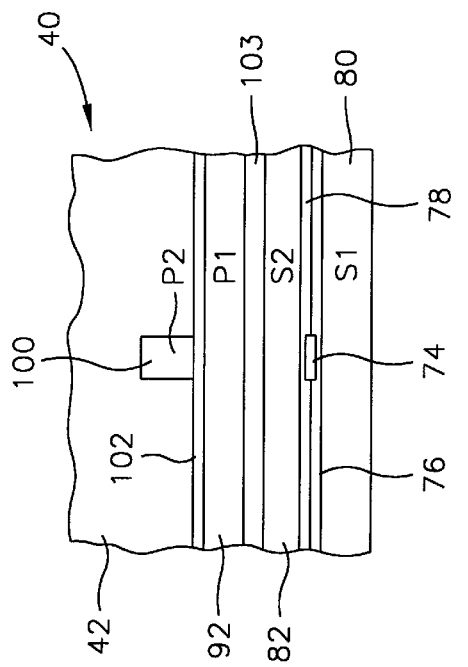
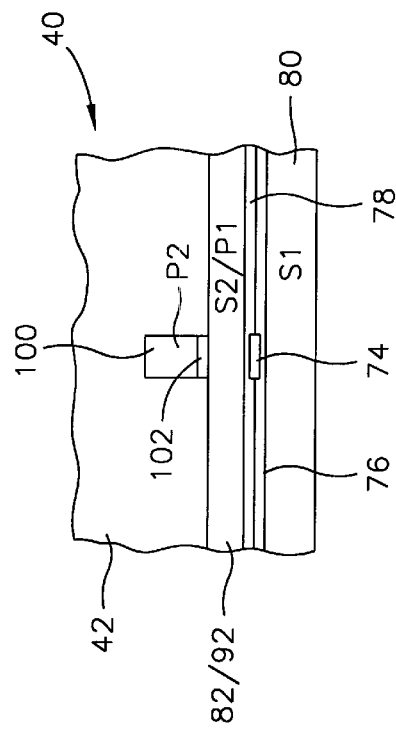
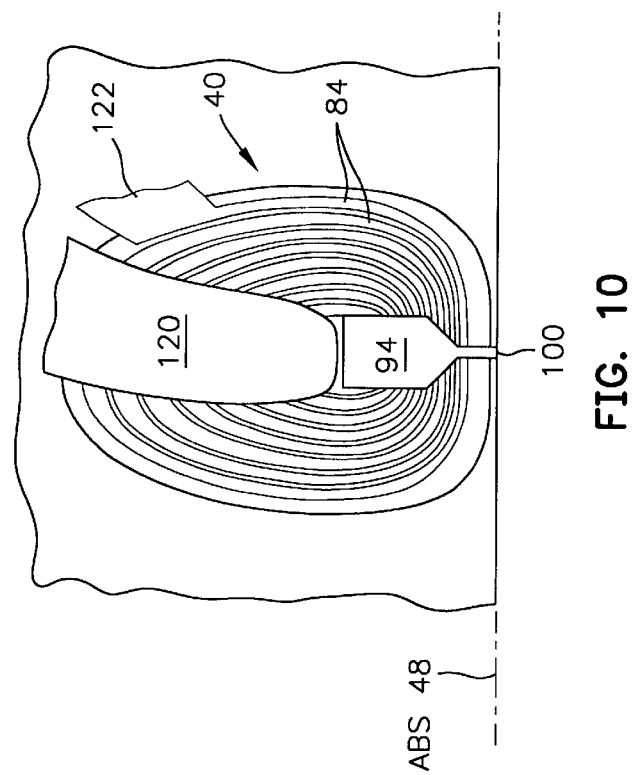
FIG. 8
FIG. 9
FIG. 10

(ABS)

SPIN VALVE SENSOR HAVING A PINNED LAYER STRUCTURE COMPOSED OF COBALT IRON VANADIUM (COFEV)

BACKGROUND OF THE INVENTION

1. Field of the Invention

The present invention relates to a spin valve sensor having a pinned layer structure composed of cobalt iron vanadium (CoFeV) and, more particularly, to such a pinned layer structure that improves read signal symmetry of a read head.

2. Description of the Related Art

The heart of a computer is an assembly that is referred to as a magnetic disk drive. The magnetic disk drive includes a rotating magnetic disk, a slider that has read and write heads, a suspension arm above the rotating disk and an actuator that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive spacer layer sandwiched between a ferromagnetic pinning layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. First and second leads are connected to the spin valve sensor for conducting a sense current therethrough. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is preferably parallel to the ABS, is when the sense current is conducted through the sensor without magnetic field signals from the rotating magnetic disk. If the quiescent position of the magnetic moment is not parallel to the ABS the positive and negative responses of the free layer will not be equal which results in read signal asymmetry which is discussed in more detail hereinbelow.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons is scattered by the interfaces of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor is a function of cos θ, where θ is the angle between the magnetic moments of the pinned and free layers. When a sense current is conducted through the spin valve sensor, resistance changes cause potential changes that are detected and processed as playback signals from the rotating magnetic disk. The sensitivity of the spin valve sensor is quantified as magnetoresistance or magnetoresistive coefficient dr/R where dr is the change in resistance of the spin valve sensor from minimum resistance (magnetic moments of free and pinned layers parallel) to maximum resistance (magnetic moments of the free and pinned layers antiparallel) and R is the resistance of the spin valve sensor at minimum resistance. Because of the high magnetoresistance of a spin valve sensor it is sometimes referred to as a giant magnetoresistive (GMR) sensor.

The transfer curve for a spin valve sensor is defined by the aforementioned cos θ where θ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields that are equal from the magnetic disk. Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. The designer strives to improve asymmetry of the readback signals as much as practical with the goal being symmetry. When the readback signals are asymmetrical, signal output and dynamic range of the sensor are reduced.

Readback asymmetry is defined as $$\frac{V_1 - V_2}{\max(V_1 \text{ or } V_2)}$$

For example, +10% readback asymmetry means that the positive readback signal $V_1$ is 10% greater than it should be to obtain readback symmetry. 10% readback asymmetry is acceptable in many applications. +10% readback asymmetry may not be acceptable in applications where the applied field magnetizes the free layer close to saturation. In these applications +10% readback asymmetry can saturate the free layer in the positive direction and will reduce the negative readback signal by 10%. An even more subtle problem is that readback asymmetry impacts the magnetic stability of the free layer. Magnetic instability of the free layer means that the applied signal has disturbed the arrangement or multiplied one or more magnetic domains of the free layer. This instability changes the magnetic properties of the free layer which, in turn, changes the readback signal. The magnetic instability of the free layer can be expressed as a percentage increase or decrease in instability of the free layer depending upon the percentage of the increase or decrease of the asymmetry of the readback signal. Standard deviation of the magnetic instability can be calculated from magnetic instability variations corresponding to multiple tests of the free layer at a given readback asymmetry. There is approximately a 0.2% decrease in standard deviation of the magnetic instability of the free layer for a 1% decrease in readback asymmetry. This relationship is substantially linear which will result in a 2.0% reduction in the standard deviation when the readback asymmetry is reduced from +10% to zero. The magnetic instability of the free layer is greater when the readback asymmetry is positive than when the readback asymmetry is negative.

The location of the transfer curve relative to the bias point is influenced by four major forces on the free layer of a spin valve sensor, namely a ferromagnetic coupling field $H_{FC}$ between the pinned layer and the free layer, a net demagnetizing (demag) field $H_D$ from the pinned layer, a sense current field $H_I$ from all conductive layers of the spin valve except the free layer and a net image current field $H_{IM}$ from the first and second shield layers. The sense current field $H_I$ is typically greater a sum of the other magnetic fields $H_{FC}$, $H_D$ and $H_{IM}$ and is difficult to counterbalance to achieve readback signal symmetry.

When the sense current $I_S$ is applied to the spin valve sensor there is an image sense current in each of the first and second shield layers. The image sense current in each shield layer causes each shield layer to produce an image sense current field $H_{IM}$ which traverses the free layer in a direction that is substantially perpendicular to the ABS. When the free layer of the AP pinned spin valve is symmetrically located midway between the first and second shield layers the image sense current fields counterbalance each other so that the net image sense current field on the free layer is zero. When the free layer is located asymmetrically between the first and second shield layers, hereinafter referred to as gap offset, the aforementioned net image sense current field can be employed for counterbalancing the other magnetic fields on the free layer. This is accomplished by sizing the first and second gap layers that separate the free layer from the first and second shield layers respectively so that the free layer is closer to a selected one of the shield layers. With increasing linear densities of magnetic read heads, a gap offset becomes impractical because of the risk of shorting between first and second lead layers to the spin valve sensor and the shield layers. For instance, in a bottom spin valve, where the free layer structure is closer to the second shield layer than to the first shield layer, the second read gap is typically narrower than the first read gap so that the second shield layer exerts a net imaging current field $H_{IM}$ on the free layer structure for counterbalancing other fields acting thereon. If this second read gap gets too narrow the thickness of the second read gap layer (G2), which is composed of alumina, will be too thin to prevent the lead layers from shorting to the second shield layer. Since the total read gap is made narrower in order to promote higher linear density of the read head, it becomes difficult to make a gap offset without shorting the lead layers to the second shield layer. The opposite situation is true for a top spin valve where the free layer structure is closer to the first shield layer than to the second shield layer.

It is desirable to employ a metallic pinning layer with the preference being platinum manganese (PtMn). Platinum manganese (PtMn) has a high blocking temperature (375° C.) which must occur before magnetic spins in the platinum manganese (PtMn) are free to rotate in response to an extraneous magnetic field. This provides the read head with high thermal stability. Unfortunately, a platinum manganese (PtMn) pinning layer causes an additional sense current field on the free layer. However, the platinum manganese (PtMn) pinning layer causes a negative ferromagnetic coupling field from the pinned layer structure on the free layer structure which is additive with the net demagnetizing field $H_D$ for counterbalancing the sense current field $H_I$.

An improved spin valve sensor, which is referred to hereinafter as antiparallel pinned (AP) spin valve sensor, is described in commonly assigned U.S. Pat. No. 5,465,185 to Heim and Parkin which is incorporated by reference herein. The AP spin valve differs from a single pinned layer spin valve in that the AP pinned layer structure has an antiparallel coupling layer which is sandwiched between ferromagnetic first and second layers. The first AP layer, which may comprise several thin films, is immediately adjacent to the antiferromagnetic pinning layer and is exchange-coupled thereto, with its magnetic moment directed in a first direction. The second AP pinned layer is immediately adjacent to the free layer and is exchange-coupled to the first AP pinned layer by the minimal thickness (in the order of 6 Å) of the antiparallel coupling layer between the first and second AP pinned layers. The magnetic moment of the second AP pinned layer is oriented in a second direction that is antiparallel to the direction of the magnetic moment of the first AP pinned layer. The magnetic moments of the first and second AP pinned layers subtractively combine to provide the AP pinned layer structure with a net magnetic moment. The direction of the net moment is determined by the thicker of the first and second AP pinned layers. The thicknesses of the first and second AP pinned layers are chosen so that the net moment is small. A small net moment equates to a small demagnetizing (demag) field exerted on the free layer by the AP pinned layer structure. Further, since the antiferromagnetic exchange coupling is inversely proportional to the net moment, this results in a large exchange coupling between the pinning and pinned layers.

Because of the strong exchange coupling between the AP pinned layer structure and the pinning layer, the AP pinned layer structure is preferred to a single pinned layer. A disadvantage of the AP pinned layer structure, as compared to the single pinned layer, is that the demag field from the AP pinned layer structure is smaller and therefore does not contribute as much in counterbalancing the large sense current field $H_I$. Another disadvantage of the AP pinned layer structure is that it has more conductive material than the single pinned layer which increases the sense current field $H_I$. The same is true for the preferred platinum manganese (PtMn) pinning layer which also adds conductive material which increases the sense current field $H_I$. Accordingly, it would be desirable to provide a spin valve sensor with the preferred AP pinned layer structure and the preferred platinum manganese (PtMn) pinning layer and yet decrease the sense current field $H_I$ so as to promote readback signal symmetry. Further, it would be desirable to accomplish this result without implementing a gap offset which increases the risk of shorting of the lead layers to the second shield layer because of pin holes in the second read gap layer.

SUMMARY OF THE INVENTION

The present invention reduces the sense current field $H_I$ by providing a pinned layer structure which is composed of cobalt iron vanadium (CoFeV). The vanadium (V) increases the resistance of the pinned layer structure which means that less sense current will be conducted through the pinned layer structure. Since there is less sense current conducted through the pinned layer structure the pinned layer structure produces less sense current field. In a preferred embodiment the cobalt iron vanadium (CoFeV) pinned layer structure is made thinner than prior art pinned layer structures with its cobalt (Co) and iron (Fe) content adjusted to increase its magnetic moment as desired. It has been found that cobalt iron vanadium ($Co_{49}Fe_{49}V_2$) has a resistance four times that of cobalt iron ($Co_{90}Fe_{10}$). As compared to cobalt iron ($Co_{90}Fe_{10}$), which is typically employed in spin valve sensors, the cobalt iron vanadium ($Co_{49}Fe_{49}V_2$) has a higher magnetic moment because of the increased iron (Fe) content. Cobalt iron vanadium ($Co_{49}Fe_{49}V_2$) has about 50% more moment than cobalt iron ($Co_{90}Fe_{10}$). With the preferred AP pinned layer structure the first AP pinned layer, which interfaces the pinning layer, may be composed of cobalt iron vanadium ($Co_{49}Fe_{49}V_2$) while the second AP pinned layer, which interfaces the spacer layer, may be cobalt iron ($Co_{90}Fe_{10}$). The higher cobalt content in the second AP pinned layer next to the spacer layer has been found to increase the magnetoresistive coefficient dr/R.

In another embodiment both of the first and second AP pinned layers may be composed of cobalt iron vanadium ($Co_{49}Fe_{49}V_2$). This embodiment would significantly reduce the sense current field produced by the AP pinned layer structure. In still a further and preferred embodiment the first AP pinned layer is composed of cobalt iron vanadium ($Co_{49}Fe_{49}V_2$) and the second AP pinned layer has first and second films, wherein the first film is composed of cobalt iron vanadium ($Co_{49}Fe_{49}V_2$) and the second film is composed of cobalt iron ($Co_{90}Fe_{10}$) with the second film interfacing the spacer layer. With this arrangement the resistance of the AP pinned layer structure can be optimized while retaining the desirable high cobalt (Co) content interface of the AP pinned layer structure with the spacer layer.

In a single pinned layer embodiment the single pinned layer may be composed of cobalt iron vanadium ($Co_{49}Fe_{49}V_2$). In another embodiment of the single pinned layer the single pinned layer may comprise first and second films wherein the first film is cobalt iron vanadium ($Co_{49}Fe_{49}V_2$) and the second film is cobalt iron ($Co_{90}Fe_{10}$). In this embodiment the second film interfaces the spacer layer so that the magnetoresistive coefficient dr/R can be increased while still optimizing a high resistance of the single pinned layer. Because of the high resistance of the pinned layer structure in each of the aforementioned embodiments there is less sense current bypassing the free layer structure which will improve the magnetoresistive coefficient dr/R of the sensor.

An object of the present invention is to provide a pinned layer structure which improves readback asymmetry and decreases sense current shunting.

Another object is to provide an AP pinned layer structure wherein a first AP pinned layer reduces a sense current field and sense current shunting and a second AP pinned layer optimizes a magnetoresistive coefficient dr/R of the read head.

A further object is to provide an AP pinned layer structure wherein each of first and second AP pinned layers reduces sense current shunting and a sense current field.

Still another object is to provide an AP pinned layer structure wherein the first AP pinned layer reduces sense current shunting and a sense current field and the second AP pinned layer reduces sense current shunting and a sense current field as well as optimizing a magnetoresistive coefficient dr/R.

Still a further object is to provide a single pinned layer structure which reduces sense current shunting and a sense current field as well as optimizing a magnetoresistive coefficient dr/R.

Other objects and advantages of the invention will become apparent upon reading the following description taken together with the accompanying drawings.

DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

FIG. 8 is a partial ABS view of the slider taken along plane 8—8 of FIG. 6 to show the read and write elements of the piggyback magnetic head;

FIG. 9 is a partial ABS view of the slider taken along plane 9—9 of FIG. 7 to show the read and write elements of the merged magnetic head;

FIG. 10 is a view taken along plane 10—10 of FIGS. 6 or 7 with all material above the coil layer and leads removed;

DETAILED DESCRIPTION OF THE PREFERRED EMBODIMENTS

Magnetic Disk Drive

Figure 1:
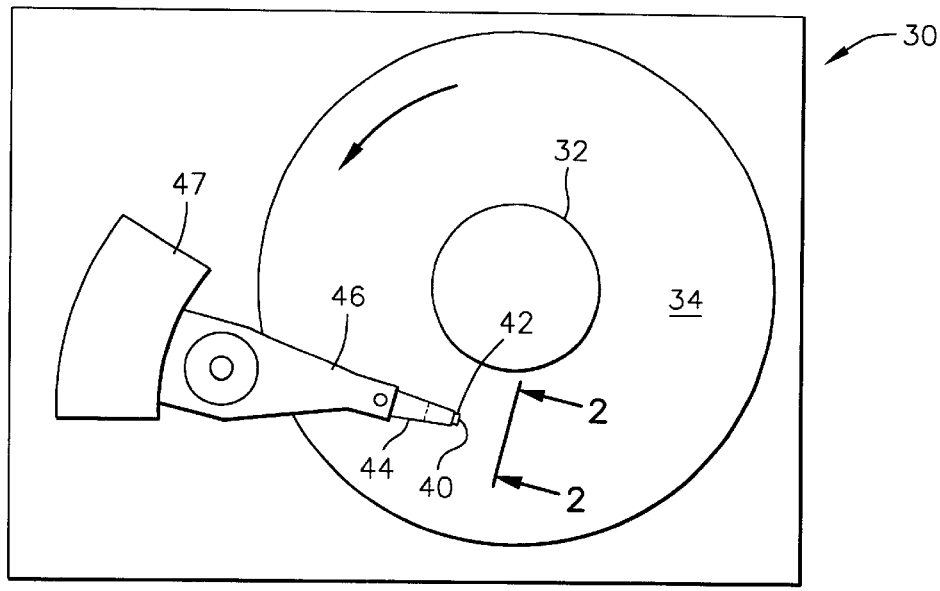
FIG. 1 is a plan view of an exemplary magnetic disk drive.
Figure 2:
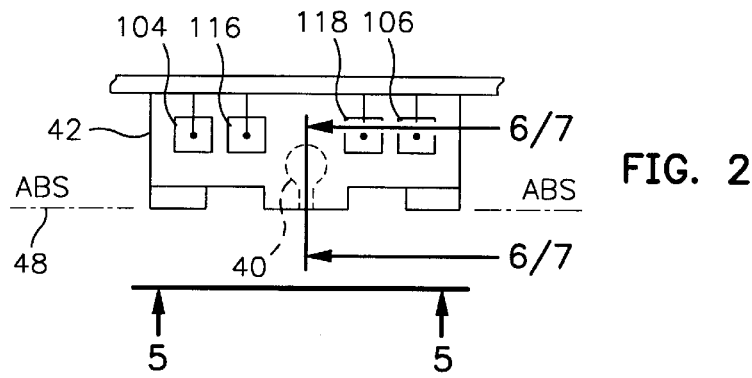
FIG. 2 is an end view of a slider with a magnetic head of the disk drive as seen in plane 2—2 of FIG. 1.
Figure 3:
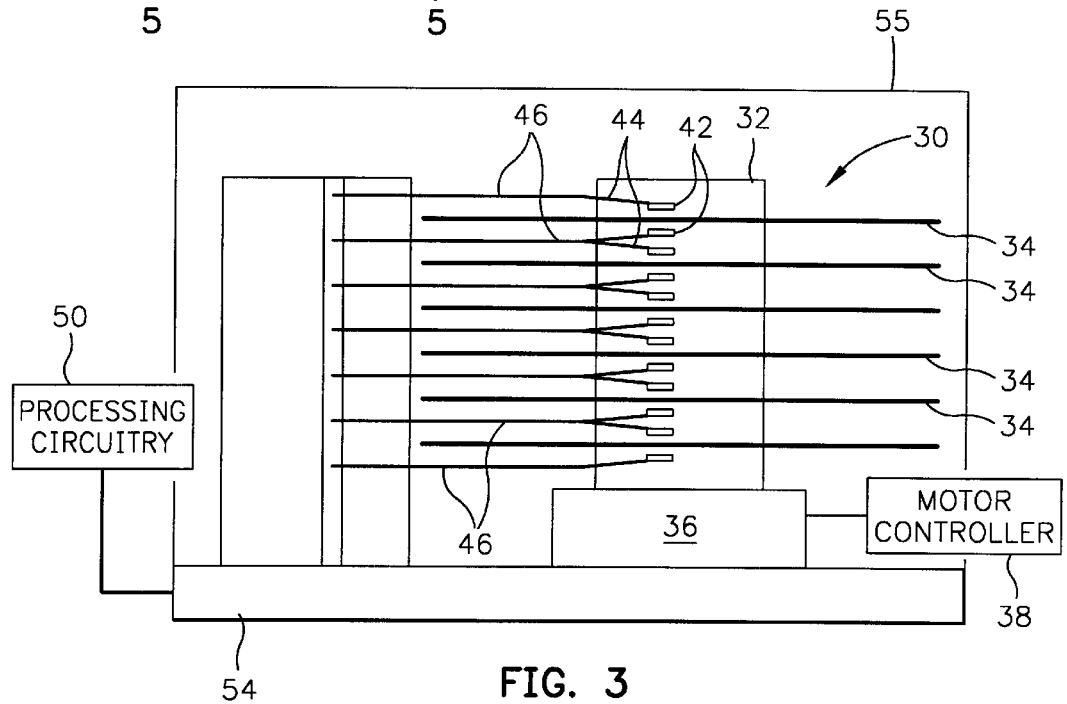
FIG. 3 is an elevation view of the magnetic disk drive wherein multiple disks and magnetic heads are employed.
Figure 4:
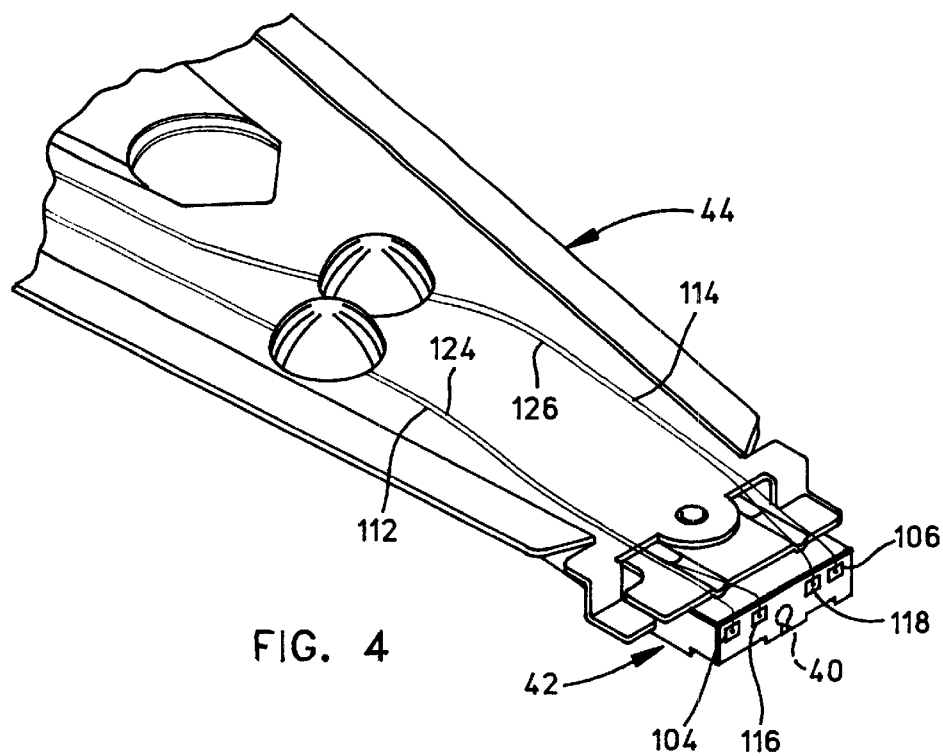
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
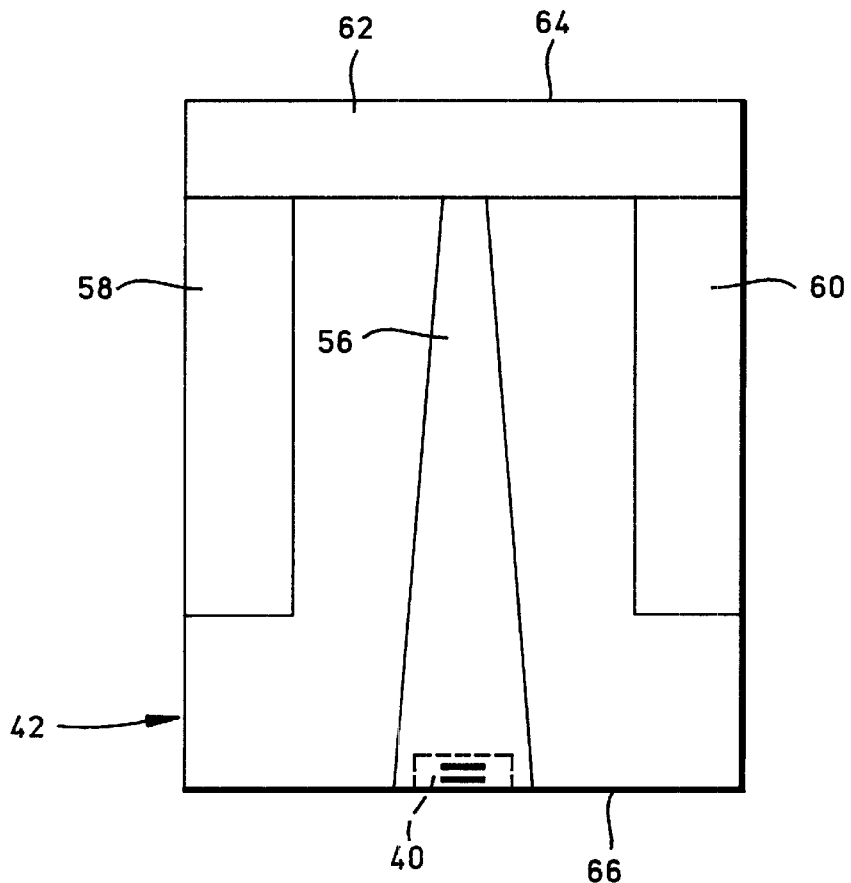
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_s$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
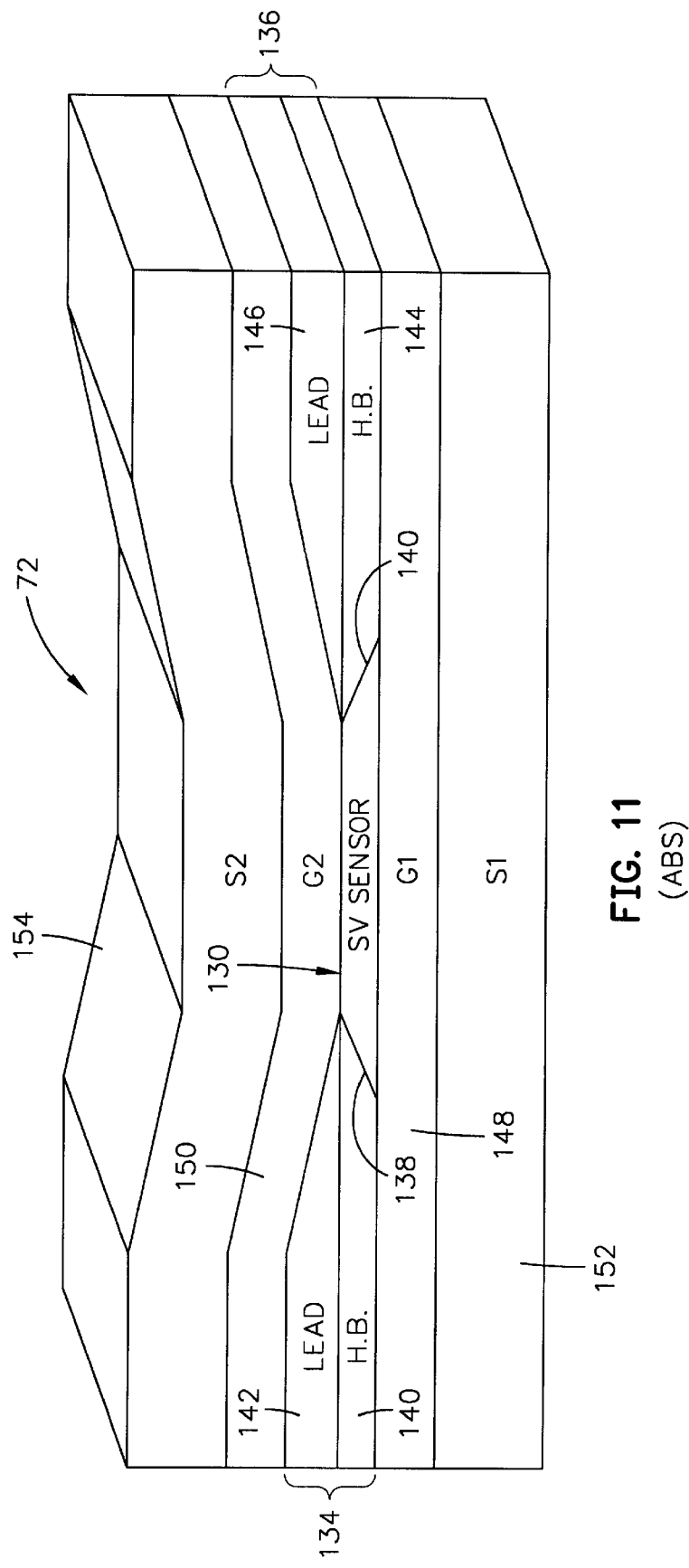
FIG. 11 is an isometric ABS illustration of a read head which employs an AP pinned spin valve (SV) sensor.

FIG. 11 is an isometric ABS illustration of the read head 72 shown in FIGS. 6 or 8. The read head 72 includes a spin valve sensor 130. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

Figure 12:
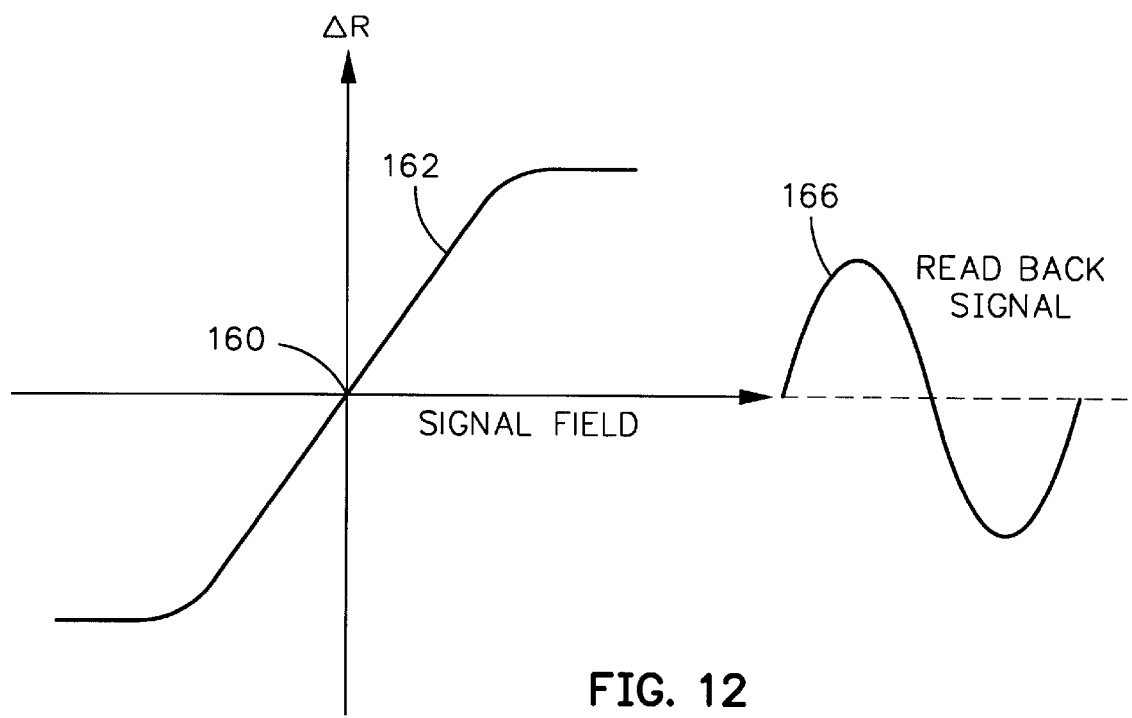
FIG. 12 is a graph showing a typical transfer curve of a spin valve sensor which results in a readback signal.
Figure 13:
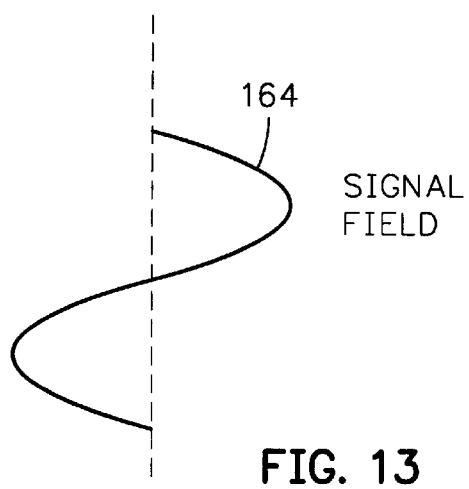
FIG. 13 is a graph illustrating a signal field applied to the spin valve sensor which results in the readback signal in FIG. 12.

FIGS. 12 and 13 show graphs for a properly biased free layer structure of a spin 25 valve sensor. In FIG. 12 a zero bias point 160 is shown midway on a transfer curve 162 of the spin valve sensor. In response to signal fields 164 from a rotating magnetic disk the readback signals 166 are symmetrical. When the signal field 164 increases the resistance of the spin valve sensor the read head produces a positive readback signal and when the signal field 164 decreases the resistance of the spin valve sensor the read head 30 produces a negative readback signal. When the bias point 160 is lowered on the transfer curve 162 the read head is said to have positive asymmetry because the positive portion of the readback signal 166 is greater than the negative portion and when the bias point 160 is moved upwardly on the transfer curve 162 the read head has negative asymmetry because the negative portion of the readback signal 166 is greater than the positive portion thereof. Exemplary fields acting on a free layer structure are 20 Oe for the sense current field $H_I$, 10 Oe for the ferromagnetic coupling field $H_{FC}$, 5 Oe for the net demagnetization field $H_D$ and 10 Oe for the imaging current field $H_{IM}$. This would cause a net field acting on the free layer structure of about 5 Oe. Each oersted causes about 1% of asymmetry which means that for the values given the read head would have 5% of asymmetry. Since the net field would rotate the magnetic moment of the free layer structure slightly downwardly toward a more antiparallel position relative to a magnetic moment of the pinned layer structure the resistance of the spin valve sensor increases which would cause the bias point 160 in FIG. 12 to be located below its present position on the transfer curve 162. In this instance the magnetic head is positively biased and the negative portion of the readback signal 166 will be less than the positive portion thereof. Readback asymmetry on the order of 5% is acceptable in the trade.

The Invention

Figure 14:
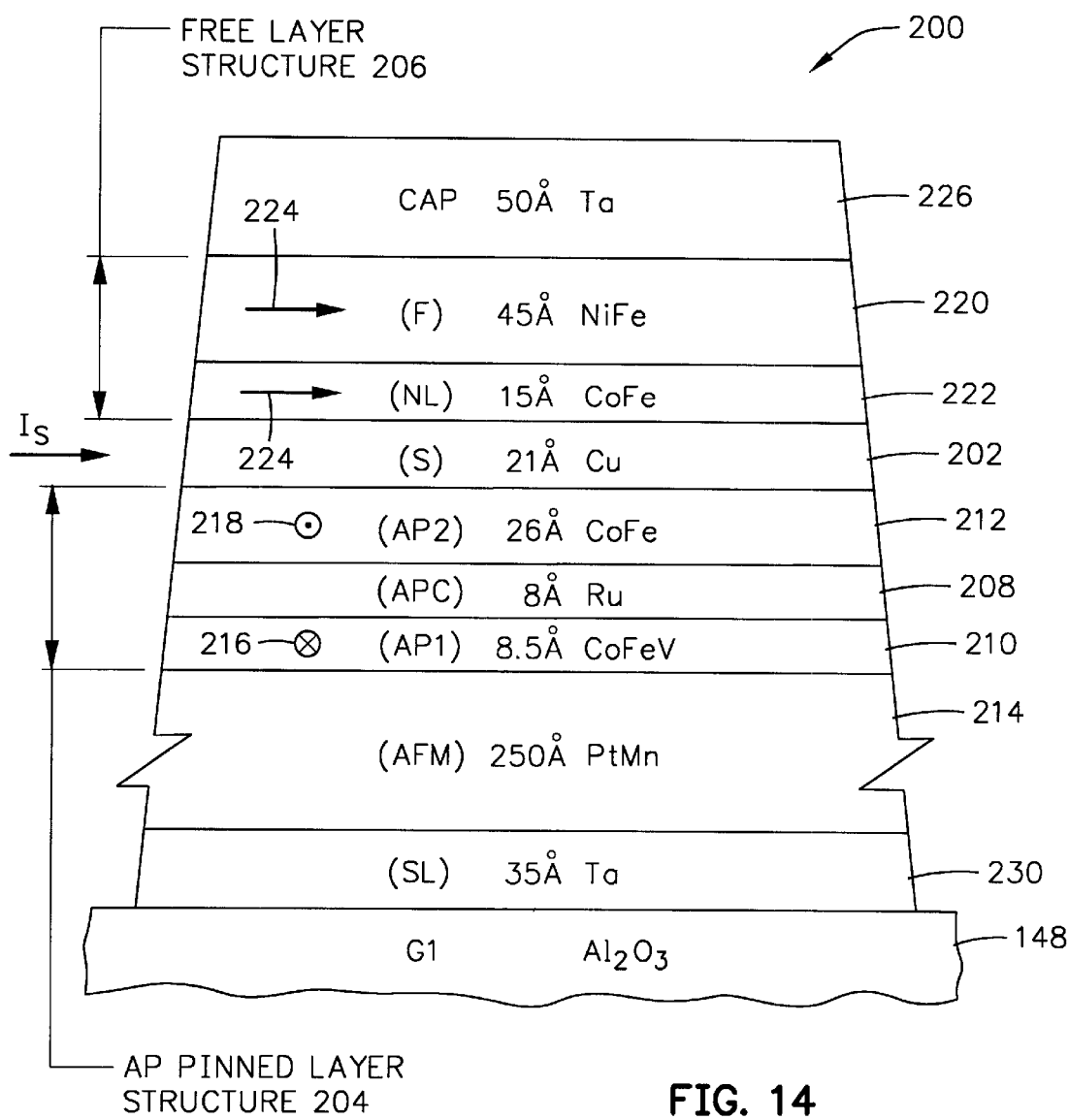
FIG. 14 is an ABS illustration of a first embodiment of the present spin valve sensor.

FIG. 14 shows an ABS illustration of an exemplary spin valve sensor 200 which includes a nonmagnetic conductive spacer layer (S) 202 which is located between an antiparallel (AP) pinned layer structure 204 and a free layer structure 206. The AP pinned layer structure 204 includes an antiparallel coupling (APC) layer 208 which is located between ferromagnetic first and second AP pinned layers (AP1) and (AP2) 210 and 212. The first AP pinned layer 210 is exchange coupled to an antiferromagnetic (AFM) pinning layer 214 for pinning a magnetic moment 216 of the first AP pinned layer perpendicular to the ABS in a direction into the sensor, as shown, or optionally away from the sensor. By strong antiparallel coupling between the first and second AP pinned layers 210 and 212 a magnetic moment 218 of the second AP pinned layer is pinned antiparallel to the magnetic moment 216.

The free layer structure 206 includes a ferromagnetic free layer (F) 220 of nickel iron (NiFe) and a nanolayer (NL) 222 of cobalt iron (CoFe). It has been found that the nanolayer 222 of cobalt iron (CoFe) significantly increases the magnetoresistive coefficient dr/R of the sensor when it interfaces the spacer layer 202 and is located between the spacer layer and the free layer 220. The free layer structure has a magnetic moment 224 which is parallel to the ABS and directed from left to right, as shown, or optionally from right to left. A cap layer 226 is located on the free layer 220 for protecting it from subsequent processing steps. When the magnetic moment 224 is rotated into the sensor by a signal field from a rotating magnetic disk the magnetic moments 224 and 218 become more antiparallel which increases the resistance of the sensor to the sense current $I_S$ and when the magnetic moment 224 is rotated out of the sensor the magnetic moments 224 and 218 become more parallel which decreases the resistance of the sensor to the sense current $I_S$. These resistance changes cause potential changes in a sense current circuit which is processed as playback signals by the processing circuitry 50 in FIG. 3.

In this embodiment the first AP pinned layer 210 is cobalt iron vanadium (CoFeV) and the second AP pinned layer is cobalt iron (CoFe). The preferred percentage of the elements in the cobalt iron vanadium (CoFeV) alloy is $Co_{49}Fe_{49}V_2$ and the preferred percentages of the elements in the cobalt iron (CoFe) alloy is $Co_{90}Fe_{10}$. The 2% of vanadium (V) in the first AP pinned layer 210 will increase its resistance 4 times over that of a first AP pinned layer constructed of cobalt iron ($Co_{90}Fe_{10}$). Further, by making the iron (Fe) content in the first AP pinned layer 210 higher the alloy has a magnetic moment which is greater than cobalt iron ($Co_{90}Fe_{10}$). With this arrangement the first AP pinned layer can have a thickness of approximately 8.5 Å of cobalt iron vanadium ($Co_{49}Fe_{49}V_2$) in lieu of 17 Å of cobalt iron ($Co_{90}Fe_{10}$) with an equivalent magnetic moment at a much higher resistance. Accordingly, the first AP pinned layer 210 will shunt less of the sense current $I_S$ and will produce a reduced sense current field on the free layer structure 206. By maintaining a high cobalt (Co) content in the second AP pinned layer 212 the magnetoresistive coefficient dr/R is enhanced as compared to a lower cobalt (Co) content, such as cobalt iron ($Co_{50}Fe_{50}$). While this is a preferred embodiment for the first and second AP pinned layers 210 and 212 it should be understood that the thicknesses may vary and the cobalt iron vanadium (CoFeV) may include different percentages and still be within the spirit of the invention. In a broader aspect of the invention the percentage of the cobalt (Co) should be less than 90%, the percentage of the iron (Fe) should be greater than 10% and the percentage of the vanadium (V) should be less than 15%. The second AP pinned layer 212 can be cobalt (Co), a cobalt based layer or cobalt iron (CoFe) wherein each of the elements cobalt (Co) and iron (Fe) can be any percentage provided the total adds up to 100%.

The pinning layer 214 is preferably composed of platinum manganese ($Pt_{50}Mn_{50}$) which has a blocking temperature of about 375° C. The spin valve sensor is constructed on the first read gap layer (G1) which is the read gap layer 148 in FIG. 11. A tantalum (Ta) seed layer (SL) 230 is located between the first read gap layer 148 and the platinum manganese (PtMn) pinning layer 214 for improving the performance of the pinning layer. The preferred thicknesses and materials of the layers are 35 Å of tantalum (Ta) for the seed layer 230, 250 Å of platinum manganese ($Pt_{50}Mn_{50}$) for the pinning layer 214, 8.5 Å of cobalt iron vanadium ($Co_{49}Fe_{49}V_2$) for the first AP pinned layer 210, 8 Å of ruthenium (Ru) for the antiparallel coupling layer 208, 26 Å of cobalt iron ($Co_{90}Fe_{10}$) for the second AP pinned layer 212, 21 Å of copper (Cu) for the spacer layer 202, 15 Å of cobalt iron ($Co_{90}Fe_{10}$) for the nanolayer 222, 45 Å of nickel iron ($Ni_{80}Fe_{20}$) for the free layer 220 and 50 Å of tantalum (Ta) for the cap layer 226.

Figure 15:
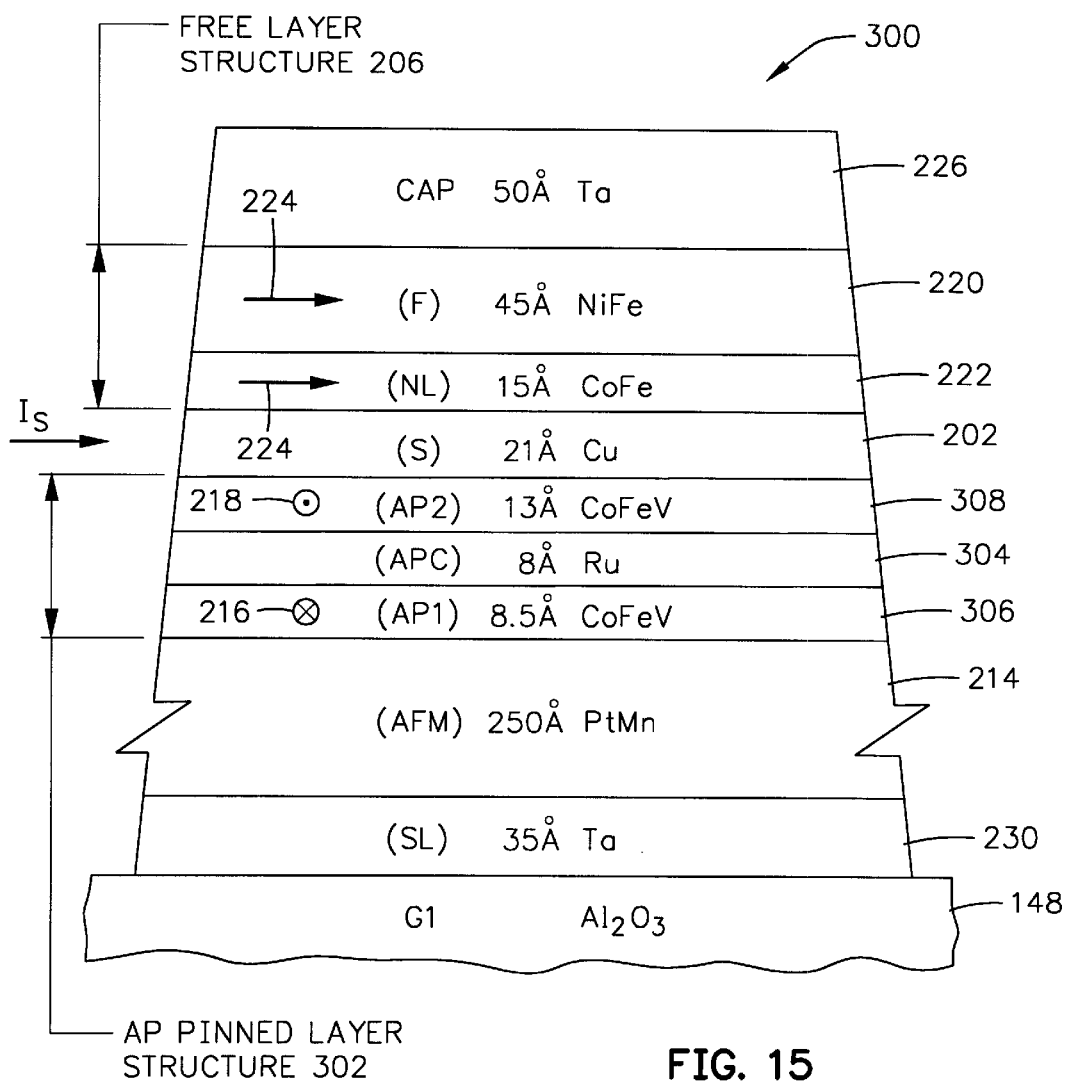
FIG. 15 is an ABS illustration of a second embodiment of the present spin valve sensor.

FIG. 15 illustrates an ABS view of a second embodiment 300 of the present spin valve sensor. The sensor 300 in FIG. 15 is the same as the sensor 200 in FIG. 14 except for the AP pinned layer structure 302 which has an AP coupling layer (APC) 304 which is located between first and second AP pinned layers (AP1) and (AP2) 306 and 308. Each of the first and second AP pinned layers 306 and 308 is composed of cobalt iron vanadium (CoFeV). The preferred material for the first AP pinned layer is cobalt iron vanadium ($Co_{49}Fe_{49}V_2$). Accordingly, the first AP pinned layer 306 can be the same as the first AP pinned layer 210 in FIG. 14 with high resistance and high moment. In one embodiment the second AP pinned layer may also be cobalt iron vanadium ($Co_{49}Fe_{49}V_2$) which will optimize the resistance and magnetic moment. Accordingly, each of the first and second AP pinned layers 306 and 308 can have a reduced thickness such as 8.5 Å and 13 Å, respectively. However, in another embodiment the second AP pinned layer 308 may be composed of cobalt iron vanadium ($Co_{89}Fe_9V_2$). In this embodiment the higher cobalt content will increase the magnetoresistive coefficient dr/R because of its interface with the spacer layer 202. However, it should be understood that other embodiments are included within the spirit of the invention wherein each of the first and second AP pinned layers 306 and 308 have a cobalt (Co) content less than 90%, an iron (Fe) content greater than 10% and a vanadium (V) content less than 15%.

Figure 16:
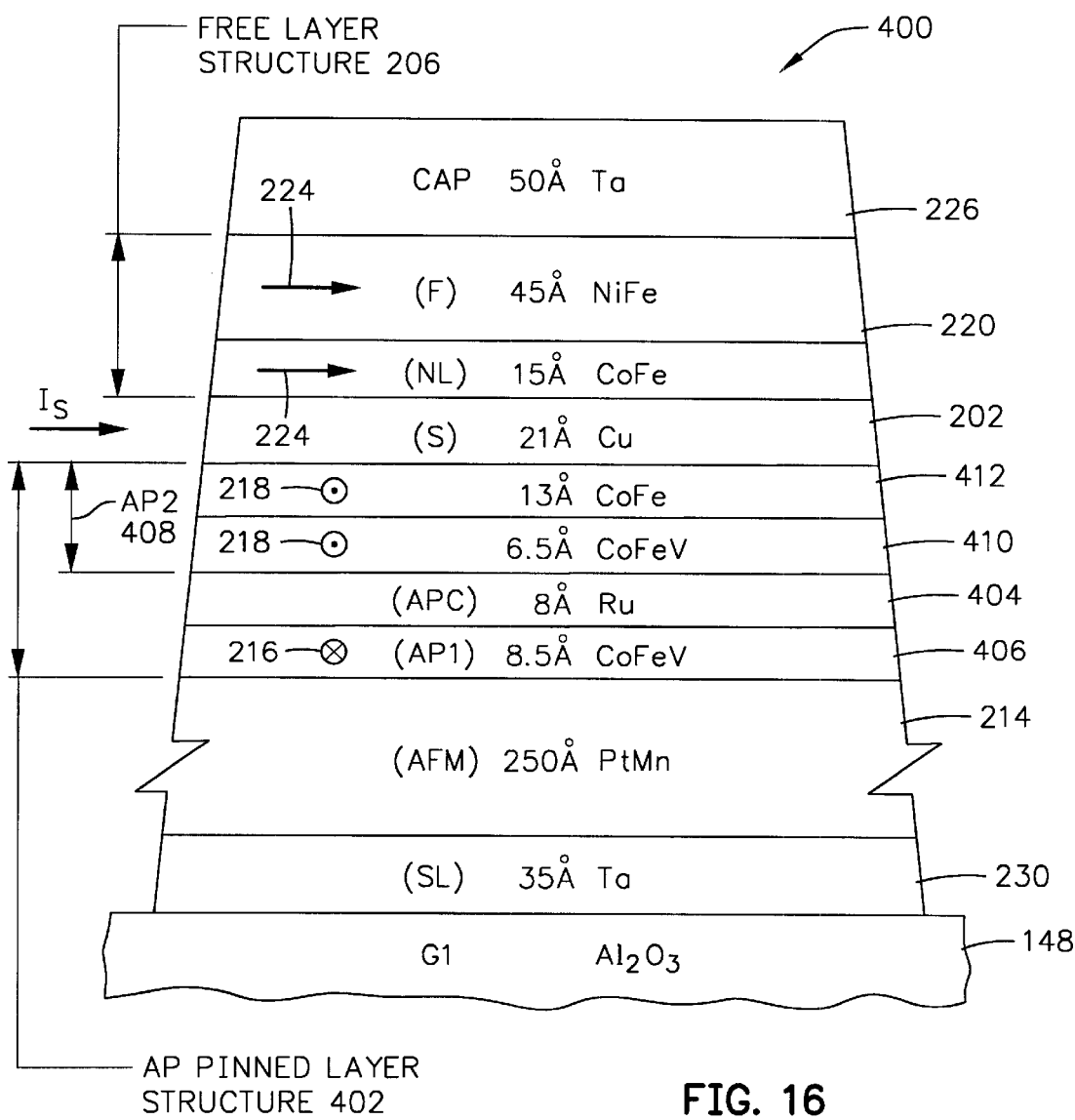
FIG. 16 is an ABS illustration of a third embodiment of the present spin valve sensor.

FIG. 16 is an ABS illustration of a third embodiment 400 of the present spin valve sensor. The sensor 400 is the same as the sensor 200 in FIG. 14 except for the AP pinned layer structure 402. The AP pinned layer structure 402 includes an antiparallel coupling (APC) layer 404 which is located between first and second AP pinned layers (AP1) and (AP2) 406 and 408. The first AP pinned layer 406 may be the same as the first AP pinned layer 210 in FIG. 14. The second AP pinned layer 408 includes first and second films 410 and 412 wherein the first film 410 interfaces the antiparallel coupling layer 404 and the second film 412 interfaces the spacer layer 202. The first film 410 is cobalt iron vanadium (CoFeV) and the second film is cobalt iron (CoFe) with the preferred percentages for the elements in the first film 410 being 49% of cobalt (Co), 49% of iron (Fe) and 2% of vanadium (V) and the preferred percentage for the second film 412 being 90% of cobalt (Co) and 10% of iron (Fe). With this arrangement the vanadium (V) in the first film increases the resistance of this film and the higher iron (Fe) content increases its moment so that a first film 410 can be employed, such as 6.5 Å. Because of the high content of cobalt (Co) in the second film 412 the magnetoresistive coefficient dr/R will be enhanced. An exemplary thickness for the second film 412 is 13 Å. Accordingly, in this embodiment both of the first and second AP pinned layers 406 and 408 are optimized for high resistance and high moment and the second AP pinned layer 408 is further enhanced by the high cobalt content alloy which interfaces the copper spacer layer 202. It should be understood that the percentages of the various elements can vary without departing from the spirit of the invention. However, in this embodiment the cobalt (Co) content in the second film 412 is higher than the cobalt (Co) content in the first film 410.

Figure 17:
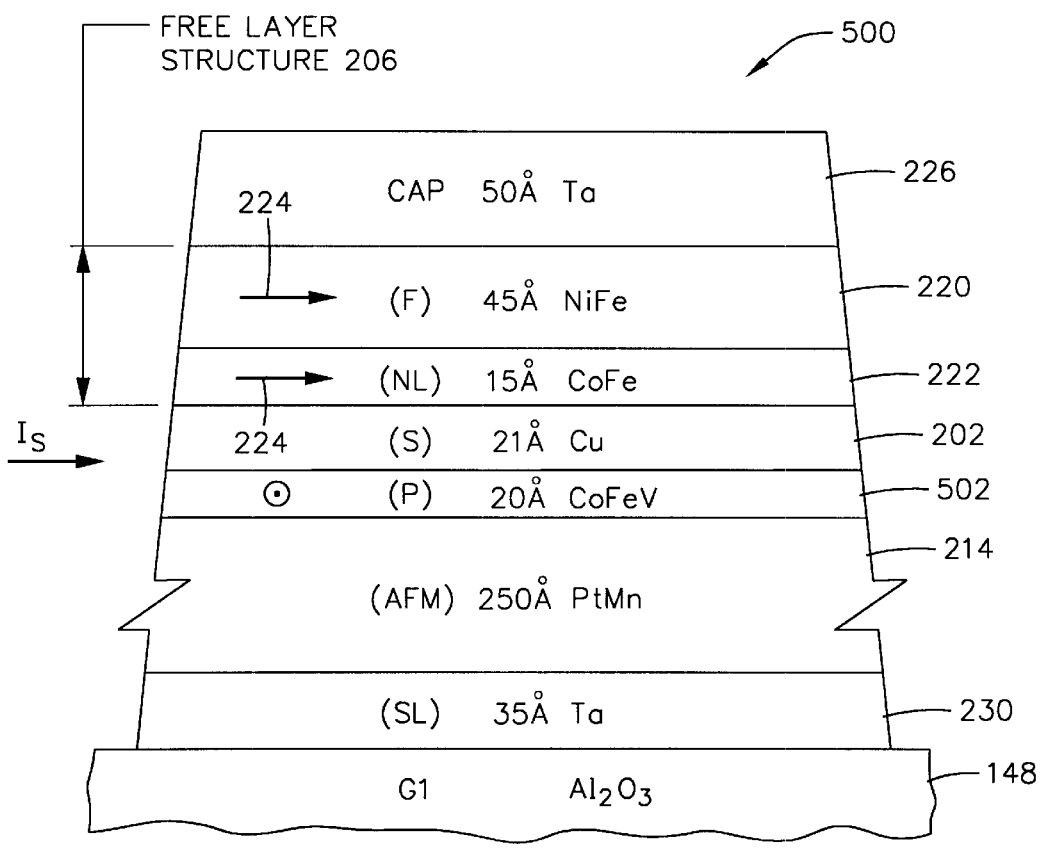
FIG. 17 is an ABS illustration of a fourth embodiment of the present spin valve sensor.

FIG. 17 illustrates an ABS view of a fourth embodiment 500 of the present spin valve sensor. The sensor 500 is the same as the sensor 200 in FIG. 14 except the AP pinned layer structure 204 in FIG. 14 has been replaced with a single pinned layer (P) 502. In this embodiment the pinned layer 502 is cobalt iron vanadium (CoFeV) with the preference being 20 Å of $Co_{49}Fe_{49}V_2$. These percentages are preferred for optimizing the resistance and minimizing the sense current field produced by the pinned layer 502. As discussed hereinabove, however, the thickness and percentages of the elements in the cobalt iron vanadium (CoFeV) may vary without departing from the spirit of the invention.

Figure 18:
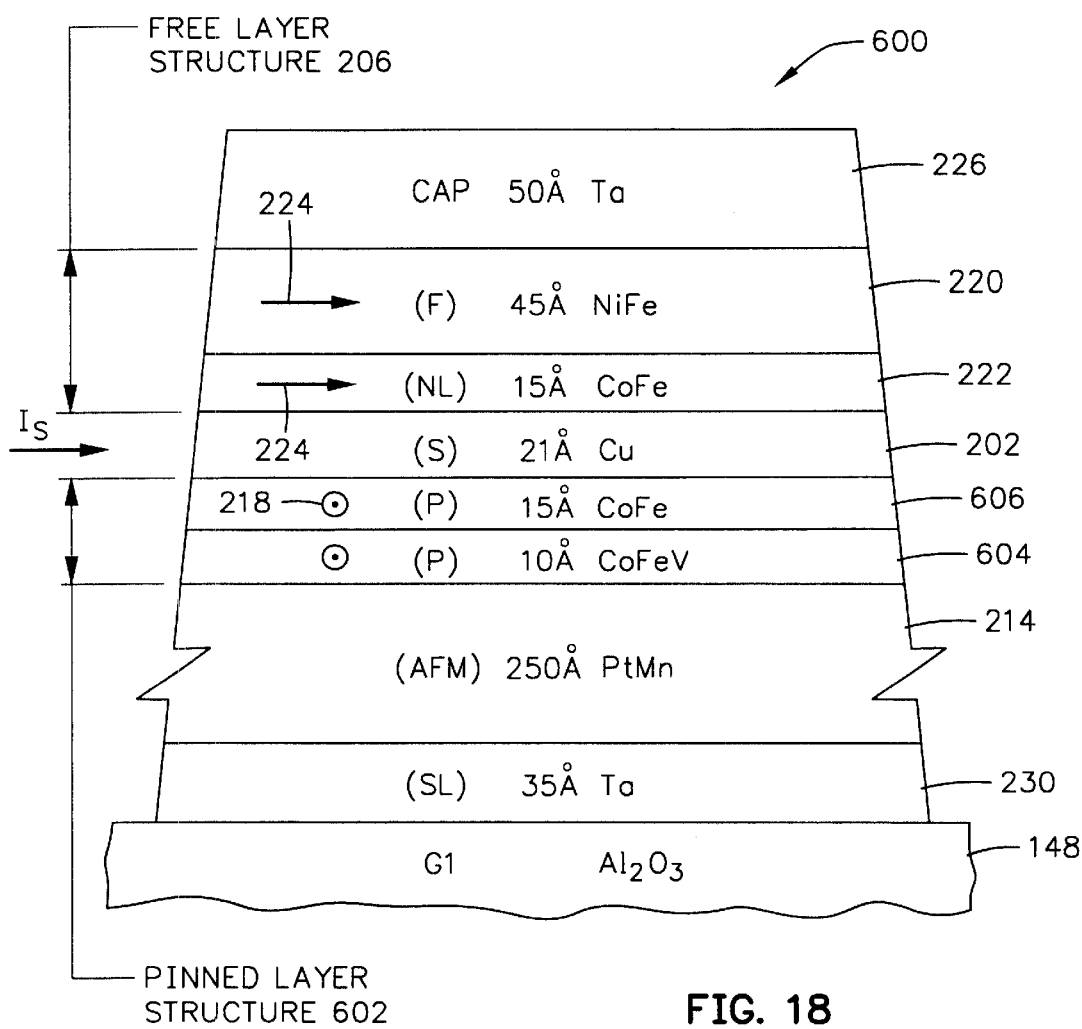
FIG. 18 is an ABS illustration of a fifth embodiment of the present spin valve sensor.

FIG. 18 illustrates an ABS view of a fifth embodiment 600 of the present spin valve sensor. The spin valve sensor 600 is the same as the spin valve sensor 500 in FIG. 17 except for the pinned layer structure 602. The pinned layer structure 602 includes first and second layers 604 and 606 wherein the first layer is cobalt iron vanadium (CoFeV) and the second layer 606 is cobalt iron (CoFe). The preferred thickness and percentage of the elements of the alloy for the first layer 604 is 10 Å of $Co_{49}Fe_{49}V_2$ and the preferred thickness and percentages of the elements of the alloy for the second layer 606 is 15 Å of $Co_{90}Fe_{10}$. With this arrangement the first layer 604 optimizes the resistance and minimizes the sense current field produced by the first layer 604 and the high cobalt (Co) content of the second layer 606 optimizes the magnetoresistive coefficient dr/R. Again, however, the thickness and percentages of the elements in each of these alloys can vary as described hereinabove without departing from the spirit of the invention. In this embodiment, however, the cobalt (Co) content in the second layer 606 is higher than the cobalt (Co) content in the first layer 604.

While platinum manganese (PtMn) is preferred for the pinning layers, it should be understood that other metallic antiferromagnetic materials may be employed such as iridium manganese (IrMn), nickel manganese (NiMn), platinum palladium manganese (PtPdMn) and platinum manganese chromium (PtMnCr). As discussed hereinabove, the spin valve sensors shown in FIGS. 14–18 are bottom spin valve sensors in that the free layer structure 206 is located closer to a second gap layer (see 150 in FIG. 11) than to the first gap layer 148. It should be understood that the invention can also be employed in a top spin valve sensor where the free layer structure is located closer to the first gap layer 148 than it is to the second gap layer 150. Further, the invention can also be used in a dual spin valve sensor wherein a free layer structure is located between first and second spacer layers, the first and second spacer layers are located between first and second pinned layer structures and the first and second pinned layer structures are located between and pinned by first and second pinning layers.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head comprising:
   a spin valve sensor including:
   a free layer structure that has a magnetic moment;
   a ferromagnetic pinned layer structure that has a net magnetic moment;
   a nonmagnetic conductive spacer layer located between the free layer structure and the pinned layer structure;
   an antiferromagnetic pinning layer exchange coupled to the pinned layer structure for pinning the net magnetic moment of the pinned layer structure;
   the pinned layer structure being composed of cobalt iron vanadium (CoFeV);
   the pinned layer structure being an antiparallel (AP) pinned layer structure that includes:
   ferromagnetic first and second antiparallel (AP) pinned layers with the first AP pinned layer interfacing the pinning layer and the second AP pinned layer interfacing the spacer layer; and
   an antiparallel (AP) coupling layer located between and interfacing the first and second AP pinned layers.

2. A magnetic read head as claimed in claim 1 wherein only the first AP pinned layer is composed of cobalt iron vanadium (CoFeV).

3. A magnetic read head as claimed in claim 2 wherein the cobalt (Co) is less than 90%, the iron (Fe) is greater than 10% and the vanadium (V) is less than 15% in the first AP pinned layer.

4. A magnetic read head as claimed in claim 1 wherein each of the first and second AP pinned layers is composed of cobalt iron vanadium (CoFeV).

5. A magnetic read head as claimed in claim 4 wherein the cobalt (Co) is less than 90%, the iron (Fe) is greater than 10% and the vanadium (V) is less than 15% in each of the first and second AP pinned layers.

6. A magnetic read head as claimed in claim 1 including:
   the second AP pinned layer including first and second films wherein the first film is composed of cobalt iron vanadium (CoFeV) and the second film is composed of cobalt (Co) or cobalt iron (CoFe); and
   the second film interfacing the spacer layer and having a percentage of cobalt (Co) that is greater than a percentage of cobalt (Co) in the first film.

7. A magnetic read head as claimed in claim 6 wherein the cobalt (Co) is less than 90%, the iron (Fe) is greater than 1% and the vanadium (V) is less than 15% in the first film.

8. A magnetic read head comprising:
   a spin valve sensor including:
   a free layer structure that has a magnetic moment;
   a ferromagnetic pinned layer structure that has a net magnetic moment;
   a nonmagnetic conductive spacer layer located between the free layer structure and the pinned layer structure;
   an antiferromagnetic pinning layer exchange coupled to the pinned layer structure for pinning the net magnetic moment of the pinned layer structure;
   the pinned layer structure being composed of cobalt iron vanadium (CoFeV);
   the pinned layer structure being a single pinned layer;
   the single pinned layer including first and second films wherein the first film is composed of cobalt iron vanadium (CoFeV) and the second film is composed of cobalt (Co) or cobalt iron (CoFe); and
   the second film interfacing the spacer layer and having a percentage of cobalt (Co) that is greater than a percentage of cobalt (Co) in the first film.

9. A magnetic read head as claimed in claim 8 wherein the cobalt (Co) is less than 90%, the iron (Fe) is greater than 10% and the vanadium (V) is less than 15% in the first film.

10. A magnetic head assembly comprising:
    a write head including:
    ferromagnetic first and second pole piece layers that have a yoke portion located between a pole tip portion and a back gap portion;
    a nonmagnetic write gap layer located between the pole tip portions of the first and second pole piece layers;
    an insulation stack with at least one coil layer embedded therein located between the yoke portions of the first and second pole piece layers; and the first and second pole piece layers being connected at their back gap portions; and a read head including:
nonmagnetic nonconductive first and second read gap layers;
a spin valve sensor located between the first and second read gap layers;
ferromagnetic first and second shield layers; and
the first and second read gap layers being located between the first and second shield layers with the first read gap layer interfacing the first shield layer and the second read gap layer interfacing the second shield layer;

the spin valve sensor including:
a free layer structure that has a magnetic moment;
a ferromagnetic pinned layer structure that has a net magnetic moment;
a nonmagnetic conductive spacer layer located between the free layer structure and the pinned layer structure;
an antiferromagnetic pinning layer exchange coupled to the pinned layer structure for pinning the net magnetic moment of the pinned layer structure; and
the pinned layer structure being composed of cobalt iron vanadium (CoFeV).

11. A magnetic head assembly as claimed in claim 10 wherein the first pole layer and the second shield layer are a common layer.

12. A magnetic head assembly as claimed in claim 10 including a nonmagnetic isolation layer located between the second shield layer and the first pole piece layer.

13. A magnetic head assembly as claimed in claim 10 wherein the pinned layer structure is a single pinned layer.

14. A magnetic head assembly comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
a read head including:
nonmagnetic nonconductive first and second read gap layers;
a spin valve sensor located between the first and second read gap layers;
ferromagnetic first and second shield layers; and
the first and second read gap layers being located between the first and second shield layers with the first read gap layer interfacing the first shield layer and the second read gap layer interfacing the second shield layer;

the spin valve sensor including:
a free layer structure that has a magnetic moment;
a ferromagnetic pinned layer structure that has a net magnetic moment;
a nonmagnetic conductive spacer layer located between the free layer structure and the pinned layer structure;
an antiferromagnetic pinning layer exchange coupled to the pinned layer structure for pinning the net magnetic moment of the pinned layer structure;
the pinned layer structure being composed of cobalt iron vanadium (CoFeV);
the pinned layer structure being an antiparallel (AP) pinned layer structure that includes:
ferromagnetic first and second antiparallel (AP) pinned layers with the first AP pinned layer interfacing the pinning layer and the second AP pinned layer interfacing the spacer layer; and
an antiparallel (AP) coupling layer located between and interfacing the first and second AP pinned layers.

15. A magnetic head assembly as claimed in claim 14 wherein only the first AP pinned layer is composed of cobalt iron vanadium (CoFev).

16. A magnetic head assembly as claimed in claim 15 wherein the cobalt (Co) is less than 90%, the iron (Fe) is greater than 10% and the vanadium (V) is less than 15% in the first AP pinned layer.

17. A magnetic head assembly as claimed in claim 14 wherein each of the first and second AP pinned layers is composed of cobalt iron vanadium (CoFeV).

18. A magnetic head assembly as claimed in claim 17 wherein the cobalt (Co) is less than 90%, the iron (Fe) is greater than 10% and the vanadium (V) is less than 15% in each of the first and second AP pinned layers.

19. A magnetic head assembly as claimed in claim 14 including:
the second AP pinned layer including first and second films wherein the first film is composed of cobalt iron vanadium (CoFeV) and the second film is composed of cobalt (Co) or cobalt iron (CoFe); and
the second film interfacing the spacer layer and having a percentage of cobalt (Co) that is greater than a percentage of cobalt (Co) in the first film.

20. A magnetic head assembly as claimed in claim 19 wherein the cobalt (Co) is less than 90%, the iron (Fe) is greater than 10% and the vanadium (V) is less than 15% in the first film.

21. A magnetic head assembly comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
a read head including:
nonmagnetic nonconductive first and second read gap layers;
a spin valve sensor located between the first and second read gap layers;
ferromagnetic first and second shield layers; and
the first and second read gap layers being located between the first and second shield layers with the first read gap layer interfacing the first shield layer and the second read gap layer interfacing the second shield layer;
the spin valve sensor including:
a free layer structure that has a magnetic moment;
a ferromagnetic pinned layer structure that has a net magnetic moment;
a nonmagnetic conductive spacer layer located between the free layer structure and the pinned layer structure;

an antiferromagnetic pinning layer exchange coupled to the pinned layer structure for pinning the net magnetic moment of the pinned layer structure;

the pinned layer structure being composed of cobalt iron vanadium (CoFeV);

the pinned layer structure being a single pinned layer;

the single pinned layer including first and second films wherein the first film is composed of cobalt iron vanadium (CoFeV) and the second film is composed of cobalt (Co) or cobalt iron (CoFe); and the second film interfacing the spacer layer and having a percentage of cobalt (Co) that is greater than a percentage of cobalt (Co) in the first film.

22. A magnetic head assembly as claimed in claim 21 wherein the cobalt (Co) is less than 90%, the iron (Fe) is greater than 10% and the vanadium (V) is less than 15% in the first film.

23. A magnetic disk drive including at least one magnetic head assembly that includes a write head and a read head, the read head including a spin valve sensor, comprising:

the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and the read head including:
nonmagnetic nonconductive first and second read gap layers;
a spin valve sensor located between the first and second read gap layers;
ferromagnetic first and second shield layers;
the first and second read gap layers being located between the first and second shield layers with the first read gap layer interfacing the first shield layer and the second read gap layer interfacing the second shield layer;

the spin valve sensor including:
a free layer structure that has a magnetic moment;
a ferromagnetic pinned layer structure that has a net magnetic moment;
a nonmagnetic conductive spacer layer located between the free layer structure and the pinned layer structure;
an antiferromagnetic pinning layer exchange coupled to the pinned layer structure for pinning the net magnetic moment of the pinned layer structure; and
the pinned layer structure being composed of cobalt iron vanadium (CoFeV);

a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head to multiple positions with respect to said magnetic disk; and
a processor connected to the magnetic head, to the spindle motor and to the actuator for exchanging signals with the magnetic head, for controlling movement of the magnetic disk and for controlling the position of the magnetic head.

24. A magnetic disk drive as claimed in claim 23 wherein the first pole layer and the second shield layer are a common layer.

25. A magnetic disk drive as claimed in claim 23 including a nonmagnetic isolation layer located between the second shield layer and the first pole piece layer.

26. A magnetic disk drive as claimed in claim 23 wherein the pinned layer structure is a single pinned layer.

27. A magnetic disk drive including at least one magnetic head assembly that includes a write head and a read head, the read head including a spin valve sensor, comprising:

the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and the read head including:
nonmagnetic nonconductive first and second read gap layers;
a spin valve sensor located between the first and second read gap layers;
ferromagnetic first and second shield layers;
the first and second read gap layers being located between the first and second shield layers with the first read gap layer interfacing the first shield layer and the second read gap layer interfacing the second shield layer;

the spin valve sensor including:
a free layer structure that has a magnetic moment;
a ferromagnetic pinned layer structure that has a net magnetic moment;
a nonmagnetic conductive spacer layer located between the free layer structure and the pinned layer structure;
an antiferromagnetic pinning layer exchange coupled to the pinned layer structure for pinning the net magnetic moment of the pinned layer structure;
the pinned layer structure being composed of cobalt iron vanadium (CoFeV);
the pinned layer structure being an antiparallel (AP) pinned layer structure that includes:
ferromagnetic first and second antiparallel (AP) pinned layers with the first AP pinned layer interfacing the pinning layer and the second AP pinned layer interfacing the spacer layer; and
an antiparallel (AP) coupling layer located between and interfacing the first and second AP pinned layers;

a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head to multiple positions with respect to said magnetic disk; and a processor connected to the magnetic head, to the spindle motor and to the actuator for exchanging signals with the magnetic head, for controlling movement of the magnetic disk and for controlling the position of the magnetic head.

28. A magnetic disk drive as claimed in claim 27 wherein only the first AP pinned layer is composed of cobalt iron vanadium (CoFeV).

29. A magnetic disk drive as claimed in claim 28 wherein the cobalt (Co) is less than 90%, the iron (Fe) is greater than 10% and the vanadium (V) is less than 15% in the first AP pinned layer.

30. A magnetic disk drive as claimed in claim 27 wherein each of the first and second AP pinned layers is composed of cobalt iron vanadium (CoFeV).

31. A magnetic disk drive as claimed in claim 30 wherein the cobalt (Co) is less than 90%, the iron (Fe) is greater than 10% and the vanadium (V) is less than 15% in each of the first and second AP pinned layers.

32. A magnetic disk drive as claimed in claim 27 including:
the second AP pinned layer including first and second films wherein the first film is composed of cobalt iron vanadium (CoFeV) and the second film is composed of cobalt (Co) or cobalt iron (CoFe); and
the second film interfacing the spacer layer and having a percentage of cobalt (Co) that is greater than a percentage of cobalt (Co) in the first film.

33. A magnetic disk drive as claimed in claim 32 wherein the cobalt (Co) is less than 90%, the iron (Fe) is greater than 10% and the vanadium (V) is less than 15% in the first film.

34. A magnetic disk drive including at least one magnetic head assembly that includes a write head and a read head, the read head including a spin valve sensor, comprising:
the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
nonmagnetic nonconductive first and second read gap layers;
a spin valve sensor located between the first and second read gap layers;
ferromagnetic first and second shield layers;
the first and second read gap layers being located between the first and second shield layers with the first read gap layer interfacing the first shield layer and the second read gap layer interfacing the second shield layer;
the spin valve sensor including:
a free layer structure that has a magnetic moment;
a ferromagnetic pinned layer structure that has a net magnetic moment;
a nonmagnetic conductive spacer layer located between the free layer structure and the pinned layer structure;
an antiferromagnetic pinning layer exchange coupled to the pinned layer structure for pinning the net magnetic moment of the pinned layer structure;
the pinned layer structure being composed of cobalt iron vanadium (CoFeV);
the pinned layer structure being a single pinned layer;
the single pinned layer including first and second films wherein the first film is composed of cobalt iron vanadium (CoFeV) and the second film is composed of cobalt (Co) or cobalt iron (CoFe); and
the second film interfacing the spacer layer and having a percentage of cobalt (Co) that is greater than a percentage of cobalt (Co) in the first film;
a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head to multiple positions with respect to said magnetic disk; and
a processor connected to the magnetic head, to the spindle motor and to the actuator for exchanging signals with the magnetic head, for controlling movement of the magnetic disk and for controlling the position of the magnetic head.

35. A magnetic disk drive as claimed in claim 34 wherein the cobalt (Co) is less than 90%, the iron (Fe) is greater than 10% and the vanadium (V) is less than 15% in the first film.

36. A method of making a magnetic read head comprising the steps of:
making a spin valve sensor as follows:
forming a free layer structure that has a magnetic moment;
forming a ferromagnetic pinned layer structure that has a net magnetic moment;
forming a nonmagnetic conductive spacer layer between the free layer structure and the pinned layer structure;
forming an antiferromagnetic pinning layer exchange coupled to the pinned layer structure for pinning the net magnetic moment of the pinned layer structure;
forming the pinned layer structure of cobalt iron vanadium (CoFeV);
the pinned layer structure being an antiparallel (AP) pinned layer structure that is formed comprising the steps of:
forming ferromagnetic first and second antiparallel (AP) pinned layers with the first AP pinned layer interfacing the first pinning layer and the second AP pinned layer interfacing the spacer layer; and
forming an antiparallel (AP) coupling layer between and interfacing the first and second AP pinned layers;
forming nonmagnetic nonconductive first and second read gap layers;
forming the spin valve sensor between the first and second read gap layers;
forming ferromagnetic first and second shield layers; and
forming the first and second read gap layers between the first and second shield layers with the first read gap layer interfacing the first shield layer and the second read gap layer interfacing the second shield layer.

37. A method of making a magnetic read head as claimed in claim 36 wherein only the first AP pinned layer is formed of cobalt iron vanadium (CoFeV).

38. A method of making a magnetic read head as claimed in claim 37 including forming the cobalt iron vanadium (CoFeV) with the cobalt (Co) less than 90%, the iron (Fe) greater than 10% and the vanadium (V) less than 15%.

39. A method of making a magnetic read head as claimed in claim 36 wherein each of the first and second AP pinned layers is formed of cobalt iron vanadium (CoFeV).

40. A method of making a magnetic read head as claimed in claim 39 including forming the cobalt iron vanadium (CoFeV) in each of the first and second AP pinned layers with the cobalt (Co) less than 90%, the iron (Fe) greater than 10% and the vanadium (V) less than 15%.

41. A method of making a magnetic read head as claimed in claim 36 including the steps of:
    forming the second AP pinned layer with first and second films wherein the first film is composed of cobalt iron vanadium (CoFeV) and the second film is composed of cobalt (Co) or cobalt iron (CoFe); and
    forming the second film interfacing the spacer layer and with a percentage of cobalt (Co) that is greater than a percentage of cobalt (Co) in the first film.

42. A method of making a magnetic read head as claimed in claim 41 including forming the cobalt iron vanadium (CoFeV) with the cobalt (Co) less than 90%, the iron (Fe) greater than 10% and the vanadium (V) less than 15%.

43. A method of making a magnetic read head comprising the steps of:
    making a spin valve sensor as follows:
        forming a free layer structure that has a magnetic moment;
        forming a ferromagnetic pinned layer structure that has a net magnetic moment;
        forming a nonmagnetic conductive spacer layer between the free layer structure and the pinned layer structure;
        forming an antiferromagnetic pinning layer exchange coupled to the pinned layer structure for pinning the net magnetic moment of the pinned layer structure;
        forming the pinned layer structure of cobalt iron vanadium (CoFeV);
        forming the pinned layer structure as a single pinned layer;
        forming the single pinned layer with first and second films wherein the first film is composed of cobalt iron vanadium (CoFeV) and the second film is composed of cobalt (Co) or cobalt iron (CoFe); and
        forming the second film interfacing the spacer layer and with a percentage of cobalt (Co) that is greater than a percentage of cobalt (Co) in the first film;
    forming nonmagnetic nonconductive first and second read gap layers;
    forming the spin valve sensor between the first and second read gap layers;
    forming ferromagnetic first and second shield layers; and
    forming the first and second read gap layers between the first and second shield layers with the first read gap layer interfacing the first shield layer and the second read gap layer interfacing the second shield layer.

44. A method of making a magnetic read head as claimed in claim 43 including forming the cobalt iron vanadium (CoFeV) with the cobalt (Co) less than 90%, the iron (Fe) greater than 10% and the vanadium (V) less than 15%.

45. A method of making a magnetic head assembly comprising the steps of:
    making a write head as follows:
        forming ferromagnetic first and second pole piece layers that have a yoke portion located between a pole tip portion and a back gap portion;
        forming a nonmagnetic write gap layer between the pole tip portions of the first and second pole piece layers;
        forming an insulation stack with at least one coil layer embedded therein between the yoke portions of the first and second pole piece layers; and
        connecting the first and second pole piece layers at their back gap portions; and
    making a read head as follows:
        forming nonmagnetic nonconductive first and second read gap layers;
        forming a spin valve sensor between the first and second read gap layers;
        forming ferromagnetic first and second shield layers; and
        forming the first and second read gap layers between the first and second shield layers with the first read gap layer interfacing the first shield layer and the second read gap layer interfacing the second shield layer;
    making the spin valve sensor as follows:
        forming a free layer structure that has a magnetic moment;
        forming a ferromagnetic pinned layer structure that has a net magnetic moment;
        forming a nonmagnetic conductive spacer layer between the free layer structure and the pinned layer structure;
        forming an antiferromagnetic pinning layer exchange coupled to the pinned layer structure for pinning the net magnetic moment of the pinned layer structure; and
        forming the pinned layer structure of cobalt iron vanadium (CoFeV).

46. A method of making a magnetic head assembly as claimed in claim 45 wherein the first pole layer and the second shield layer are formed as a common layer.

47. A method of making a magnetic head assembly as claimed in claim 45 including forming a nonmagnetic isolation layer between the second shield layer and the first pole piece layer.

48. A method of making a magnetic head assembly as claimed in claim 45 including forming the pinned layer structure as a single pinned layer.

49. A method of making a magnetic head assembly comprising the steps of:
    making a write head as follows:
        forming ferromagnetic first and second pole piece layers that have a yoke portion located between a pole tip portion and a back gap portion;
        forming a nonmagnetic write gap layer between the pole tip portions of the first and second pole piece layers;
        forming an insulation stack with at least one coil layer embedded therein between the yoke portions of the first and second pole piece layers; and
        connecting the first and second pole piece layers at their back gap portions; and
    making a read head as follows:
        forming nonmagnetic nonconductive first and second read gap layers;
        forming a spin valve sensor between the first and second read gap layers;
        forming ferromagnetic first and second shield layers; and
        forming the first and second read gap layers between the first and second shield layers with the first read gap layer interfacing the first shield layer and the second read gap layer interfacing the second shield layer;

making the spin valve sensor as follows:
  forming a free layer structure that has a magnetic moment;
  forming a ferromagnetic pinned layer structure that has a net magnetic moment;
  forming a nonmagnetic conductive spacer layer between the free layer structure and the pinned layer structure;
  forming an antiferromagnetic pinning layer exchange coupled to the pinned layer structure for pinning the net magnetic moment of the pinned layer structure;
  forming the pinned layer structure of cobalt iron vanadium (CoFeV);
  the pinned layer structure being an antiparallel (AP) pinned layer structure that is formed comprising the steps of:
    forming ferromagnetic first and second antiparallel (AP) pinned layers with the first AP pinned layer interfacing the first pinning layer and the second AP pinned layer interfacing the spacer layer; and
    forming an antiparallel (AP) coupling layer between and interfacing the first and second AP pinned layers.

50. A method of making a magnetic head assembly as claimed in claim 49 wherein only the first AP pinned layer is formed of cobalt iron vanadium (CoFeV).

51. A method of making a magnetic head assembly as claimed in claim 50 including forming the cobalt iron vanadium (CoFeV) with the cobalt (Co) less than 90%, the iron (Fe) greater than 10% and the vanadium (V) less than 15%.

52. A method of making a magnetic head assembly as claimed in claim 49 wherein each of the first and second AP pinned layers is formed of cobalt iron vanadium (CoFeV).

53. A method of making a magnetic head assembly as claimed in claim 52 including forming the cobalt iron vanadium (CoFeV) in each of the first and second AP pinned layers with the cobalt (Co) less than 90%, the iron (Fe) greater than 10% and the vanadium (V) less than 15%.

54. A method of making a magnetic head assembly as claimed in claim 49 including the steps of:
  forming the second AP pinned layer with first and second films wherein the first film is composed of cobalt iron vanadium (CoFeV) and the second film is composed of cobalt (Co) or cobalt iron (CoFe); and
  forming the second film interfacing the spacer layer and with a percentage of cobalt (Co) that is greater than a percentage of cobalt (Co) in the first film.

55. A method of making a magnetic head assembly as claimed in claim 54 including forming the cobalt iron vanadium (CoFeV) with the cobalt (Co) less than 90%, the iron (Fe) greater than 10% and the vanadium (V) less than 15%.

56. A method of making a magnetic head assembly comprising the steps of:
  making a write head as follows:
    forming ferromagnetic first and second pole piece layers that have a yoke portion located between a pole tip portion and a back gap portion;
    forming a nonmagnetic write gap layer between the pole tip portions of the first and second pole piece layers;
    forming an insulation stack with at least one coil layer embedded therein between the yoke portions of the first and second pole piece layers; and
    connecting the first and second pole piece layers at their back gap portions; and
  making a read head as follows:
    forming nonmagnetic nonconductive first and second read gap layers;
    forming a spin valve sensor between the first and second read gap layers;
    forming ferromagnetic first and second shield layers; and
    forming the first and second read gap layers between the first and second shield layers with the first read gap layer interfacing the first shield layer and the second read gap layer interfacing the second shield layer;
  making the spin valve sensor as follows:
    forming a free layer structure that has a magnetic moment;
    forming a ferromagnetic pinned layer structure that has a net magnetic moment;
    forming a nonmagnetic conductive spacer layer between the free layer structure and the pinned layer structure;
    forming an antiferromagnetic pinning layer exchange coupled to the pinned layer structure for pinning the net magnetic moment of the pinned layer structure;
    forming the pinned layer structure of cobalt iron vanadium (CoFeV);
    forming the pinned layer structure as a single pinned layer;
    forming the single pinned layer with first and second films wherein the first film is composed of cobalt iron vanadium (CoFeV) and the second film is composed of cobalt (Co) or cobalt iron (CoFe); and
    forming the second film interfacing the spacer layer and with a percentage of cobalt (Co) that is greater than a percentage of cobalt (Co) in the first film.

57. A method of making a magnetic head assembly as claimed in claim 56 including forming the cobalt iron vanadium (CoFeV) with the cobalt (Co) less than 90%, the iron (Fe) greater than 10% and the vanadium (V) less than 15%.

* * * * *

UNITED STATES PATENT AND TRADEMARK OFFICE
CERTIFICATE OF CORRECTION

PATENT NO.   : 6,587,317 B2
DATED        : July 1, 2003
INVENTOR(S)  : Hardayal Singh Gill It is certified that error appears in the above-identified patent and that said Letters Patent is hereby corrected as shown below:

Column 12,
Line 32, change "1%" to -- 10% --

Signed and Sealed this

Twenty-fifth Day of November, 2003

JAMES E. ROGAN
*Director of the United States Patent and Trademark Office*